United States Patent [19]

Aguglia

[11] Patent Number: 4,597,286
[45] Date of Patent: Jul. 1, 1986

[54] MECHANICAL-ELECTROMAGNETIC PRESSURE SENSOR

[76] Inventor: Gianluigi Aguglia, 30 Viale Japigia, 73100 Lecce, Italy

[21] Appl. No.: 556,154

[22] Filed: Nov. 29, 1983

[51] Int. Cl.$^4$ .................... B60C 23/02; G01L 7/06; G01L 9/10
[52] U.S. Cl. .................................. 73/146.5; 340/58
[58] Field of Search .............. 73/146.5, 146.4, 146.8, 73/728; 340/58

[56] References Cited

U.S. PATENT DOCUMENTS 2,070,743  2/1937  McDonnell .................. 73/146.5
2,510,785  6/1950  Potts et al. .................. 73/146.5

FOREIGN PATENT DOCUMENTS 0109940  8/1980  Japan .................. 73/146.5

*Primary Examiner*—Donald O. Woodiel

[57] ABSTRACT

The present invention is a remote system for indicating tire pressure which includes a mechanical electromagnetic pressure sensor which is disposed outside a pneumatic tire which is mounted on a wheel rim. The mechanical electromagnetic pressure sensor includes a bellows which is fluidly coupled to the pneumatic tire through the wheel rim and a ferrite rod which is fixedly coupled to the bellows. The mechanical electromagnetic pressure sensor includes a pointer which is mechanically coupled to the bellows and indexing plate which provides a linear scale of the position of the pointer, the indexing plate is disposed adjacent, but not contiguous to the pointer so that the scale of the indexing plate mechanically provides a direct and visual reading of the pressure in the pneumatic tire. The remote system also includes a passive circuit having a first coil which is mechanically coupled to the wheel rim and a second coil which is electromagnetically coupled to the ferrite rod, which is slidably coupled to the second coil, all of which are electrically coupled to form a tuned circuit which resonates at a particular frequency which is dependent on the position of the ferrite rod. The remote system also includes a probe which detects the change in frequency at which the passive circuit resonates in order to provide a measure of movement of the ferrite rod in response to the change in pressure of the pneumatic tire.

2 Claims, 2 Drawing Figures

MECHANICAL-ELECTROMAGNETIC PRESSURE SENSOR

BACKGROUND OF THE INVENTION

1. Field of the Invention

The present invention relates to a tire pressure indicator for indicating the pressure in a tire and more particularly to a remote tire pressure indicator having a bellows which is fluidly coupled to the tire in order to provide a mechanical and visually direct reading of the pressure in the tire and which is electromagnetically coupled to a ferrite rod in order to provide an electrical signal which is related to the pressure in the tire.

2. Description of the Prior Art

U.S. Pat. No. 4,334,428, entitled Apparatus for Indicating Parameters Sensed on a Rotatable Wheel, issued to Raoul G. Fima and Jacques E. Mahieux on June 15, 1982, teaches a circuit which is mounted on a rotatable wheel of a vehicle and which varies its resonant frequency in accordance with tire pressure. U.S. Pat. No. 4,283,707, entitled Aircraft Low Pressure Tire Warning System Having Comparator Circuit for Each Axle Pair of a Four Wheel Bogie Configuration, issued to Royce F. Church on Aug. 11, 1981, teaches pressures transducers which coupling transformers electrically couple to a signal processor.

U.S. Pat. No. 4,389,884, entitled Remote Tire Pressure, issued to Gianluigi Agulia on June 28, 1983, teaches a remote system for indicating tire pressure for use in combination with a pressure transducer which is disposed inside a pneumateic tire. The pneumatic tire is mounted on a wheel rim. The remote system includes a ferrite rod which is mechanically coupled to the pressure transducer and which is disposed within the pneumatic tire. The remote system also includes a passive circuit including a first coil which is mechanically coupled to the wheel rim, a second coil which is electromagnetically coupled to the ferrite rod, which is slidably coupled to the second coil and a capacitor, all of which are electrically coupled in series to form a tuned circuit which resonates at a particular frequency which is dependent on the position of the ferrite rod, and a detector which detects the change in frequency at which the first circuit resonates thereby providing a measure of movement of the ferrite rod in response to the change in pressure of the pneumatic tire. The detector includes an oscillating circuit having a coil of several turns on a rod of highly permeable material which is disposed adjacent to the first coil of the passive circuit on the wheel rim whereby the passive circuit receives energy from the oscillating circuit. As a result of the linear movement of the ferrite rod there will be a change in the frequency at which the passive circuit resonates thereby producing a voltage across the coil of the oscillating circuit which is linearly proportional to the change of pressure in the pneumatic tire. The detector also includes an amplifier which amplifies the voltage which is electrically coupled to the oscillating circuit and a metering display which displays the amplified voltage.

U.S. Pat. No. 4,373,385, entitled Fluid Pressure Detection, issued to Raymond Boutteville and Thierry Febvret on Feb. 15, 1983, teaches a pressure sensor for measuring the pressure in an aircraft wheel tire which includes a stationary housing and a shaft connected to the wheel. A unit slidably connected to the shaft has a surface cooperating with a pair of bellows coaxial to the shaft to define a pressure chamber. A passage in the shaft communicates the pressure chamber and the tire.

U.S. Pat. No. 4,348,896, entitled Apparatus for Indicating Pressure in Pneumatic Tires, issued to Athanase Sarides on Sept. 14, 1982, teaches an apparatus for indicating pressure in a pneumatic tire on a wheel while in motion on a vehicle which includes an actuator secured to the wheel so as to rotate therewith. The acutuator has an extendible bag member in communication with air in the tire, aspring controlling extension of the bag by air in the tire to cause the bag member to be extended by an amount indicative of the air pressure in the tire, and a magnet positioned in accordance with the amount of extension of the bag member and therefore in accordance with the air pressure in the tire. A series of magnetically actuated switches are mounted on the vehicle for selective actuation by the magnet in accordance with the position of the magnet as it rotates with the tire, and indicators connected to the magnetically actuated switches indicate air pressure in the tire by indicating the magnetically actuated switch selectively actuated.

U.S. Pat. No. 4,226,126, entitled Mechanical Displacement-Electrical Signal Transducer, issued to Werner Herdon on Oct. 7, 1980, teaches in order to measure small displacement of a membrane under change of pneumatic pressure applied at opposite sides thereto, a ferromagnetic wire which is stretched between a fixed support and the membrane. An exciter coil, connected to a source of alternating current of suitable strength cyclically reversely magnetizes the ferromagnetic wire. A pick-up coil is eletromagnetically coupled to the wire to sense the change of magnetization thereof which will be in the form of sharp needle pulses as the magnetization of the wire changes, the pulse amplitude and pulse width being highly dependent on the strain in the wire and hence on the deflection of the membrane. The wire may be stressed under tension.

U.S. Pat. No. 4,250,759, entitled Digital Readout Gauge, issued to Otto Z. Vago and Frank S. Irlinger on Feb. 17, 1981, teaches a digital readout gauge which may be a tire pressure gauge which is mounted in a small portable housing. A pressure chamber is formed within the housing with a valve core deflator mounted within the housing to depress the core of a standard tire valve and permit the air pressure within the tire to be introduced into the chamber. A wall of the chamber is movable with changes of pressure and a piezoelectric crystal transducer or strain gauge transducer is mounted to be stressed in accordance with movement of this wall to develop an analog voltage in accordance with the air pressure. An electrical circuit is contained within the housing and energizable by a battery carried within the housing. A power switch is actuated to an on condition by movement of the gauge onto the tire valve to energize the electrical circuit with the analog voltage passed to an analog-to-digital converter and then to a digital readout display to display the digital value of the air pressure within the tire.

U.S. Pat. No. 4,195,531, entitled Pressure Detector Using an Average Circuit, issued to Kenji Okamura on Apr. 1, 1980, teaches a pressure detector which includes a spring-loaded diaphragm mounted in a housing to define a pressure chamber to which test fluid is introduced. A pulse generating element is provided to generate an electrical pulse in response to a displacement of the diaphragm when the fluid pressure in the pressure chamber exceeds a predetermined level. An averaging circuit is connected to the pulse generating element to convert the pulses into a signal having a voltage level representative of the mean value of the pressure variation.

SUMMARY OF THE INVENTION

In view of the foregoing factors and conditions which are characteristic of the prior art it is the primary object of the present invention to provide a remote tire pressure indicator which has a bellows which is fluidly coupled to the tire and which provides a mechanical and visually direct reading of the pressure in the tire.

It is another object of the present invention to provide a remote tire pressure indicator which has a bellows which is electromagnetically coupled to a ferrite rod in order to provide an electrical signal which is related to the pressure in the tire.

In accordance with the preferred embodiment of the present invention a combination of a remote system for indicating tire pressure which includes a mechanical electromagnetic pressure sensor which is disposed outside a pneumatic tire which is mounted on a wheel rim is described. The mechanical electromagnetic pressure sensor includes a bellows which is fluidly coupled to the pneumatic tire through the wheel rim and a ferrite rod which is fixedly coupled to the bellows. The mechanical electromagnetic pressure sensor includes a pointer which is mechanically coupled to the bellows and indexing plate which provides a linear scale of the position of the pointer, the indexing plate is disposed adjacent, but not contiguous to the pointer so that the scale of the indexing plate mechanically provides a direct and visual reading of the pressure in the pneumatic tire. The remote system also includes a passive circuit having a first coil which is mechanically coupled to the wheel rim and a second coil which is electromagnetically coupled to the ferrite rod, which is slidably coupled to the second coil, all of which are electrically coupled to form a tuned circuit which resonates at a particular frequency which is dependent on the position of the ferrite rod. The remote system also includes a probe which detects the change in frequency at which the passive circuit resonates in order to provide a measure of movement of the ferrite rod in response to the change in pressure of the pneumatic tire.

The features of the present invention which are believed to be novel are set forth with particularity in the appended claims.

Other claims and many of the attendant advantages will be more readily appreciated as the same becomes better understood by reference to the following detailed description and considered in connection with the accompanying drawing in which like reference symbols designate like parts throughout the figures.

DESCRIPTION OF THE PREFERRED EMBODIMENT

Figure 1:
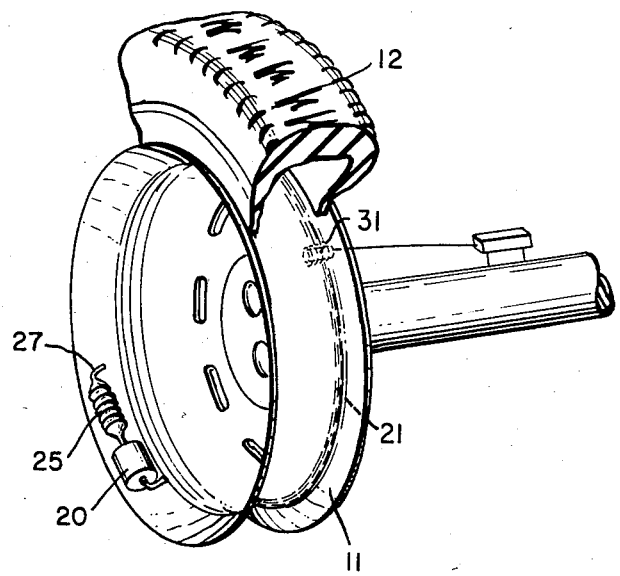
FIG. 1 is a partial perspective of a mechanical electromagnetic pressure sensor for use in a remote tire pressure indicator which is mechanically coupled to a wheel rim and fluidly coupled to a pneumatic tire and which has been constructed in accordance with the principles of the present invention.

In order to best understand the present invention it is necessary to refer to the following description of its preferred embodiment in conjunction with the accompanying drawing. U.S. Pat. No. 4,389,884 teaches a remote system for indicating tire pressure for use in combination with a pressure transducer which is disposed inside a pneumateic tire. Referring to FIG. 1 the pressure transducer of the remote system is mechanically coupled to a wheel rim 11 inside a pneumatic tire 12. The present invention is a mechanical electromagnetic pressure sensor 20 which is mechanically coupled to the wheel rim 11 outside the pneumatic tire 12. The remote system includes a passive circuit having a first coil 21 which is mechanically coupled to the wheel rim 11 and a second coil 22, both of which are electrically coupled to form a tuned circuit which resonates at a particular frequency. The second coil 22 is electromagnetically coupled to a ferrite rod 24 which is slidably coupled to the second coil 22. The resonating frequency of the tuned circuit is dependent on the position of the ferrite rod 24.

Figure 2:
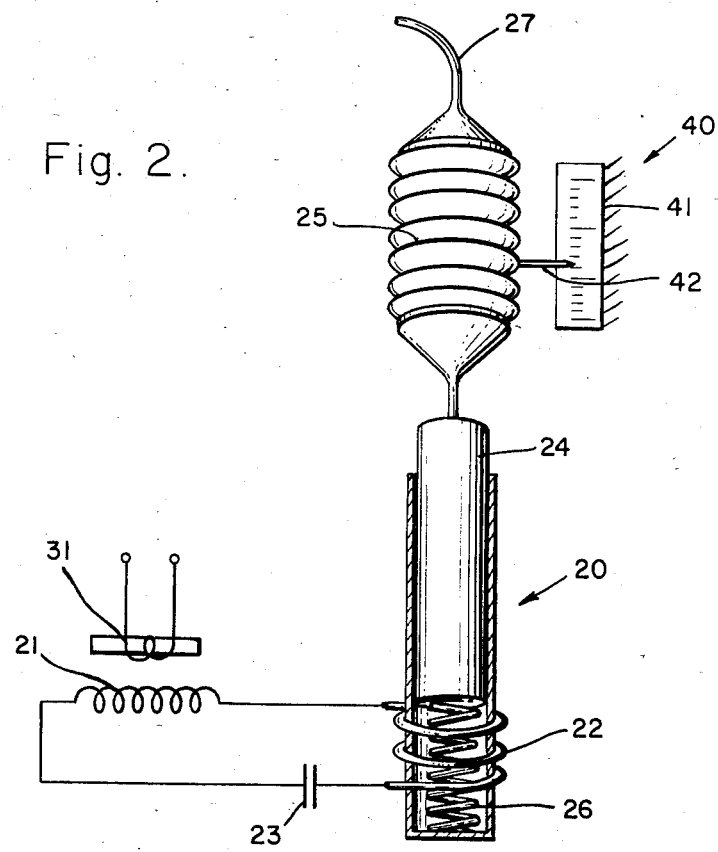
FIG. 2 is schematic representation of a passive system of the remote tire pressure indicator which is used with the mechanical electromagnetic pressure sensor of FIG. 1.

Still referring to FIG. 2 in conjunction with FIG. 1 the mechanical electromagnetic pressure sensor 20 includes a ferrite rod 24 and a bellows 25 which is fluidly coupled to the pneumatic tire 12 through the wheel rim 11. The ferrite rod 24 is fixedly coupled to the bellows 25 and slideably coupled to the wheel rim 11. The mechanical electromagnetic pressure sensor 20 is disposed outside the pneumatic tire 12 which is mounted on the wheel rim 11.

The passive circuit receives energy from the oscillating circuit so that the movement of the ferrite rod causes a change in the frequency at which the passive circuit resonates thereby producing a voltage across the third coil 31 of the oscillating circuit which is proportional to the change of pressure in the pneumatic tire 12. An amplifier is electrically coupled to the oscillating circuit and amplifies the voltage. A display devices displays the amplified voltage.

A detector detects the change in frequency at which the passive circuit resonates in order to provide a measure of movement of the ferrite rod in response to the change in pressure of the pneumatic tire. The detector includes an oscillating circuit having a third coil 31 of several turns on a rod of highly permeable material which is disposed adjacent to the first coil 21 of the passive circuit on the wheel rim 11.

Referring to FIG. 2 the mechanical electromagnetic pressure sensor 20 also includes an indexing plate 41 and a pointer 42 which is mechanically coupled to the bellows 25. The indexing plate 41 provides a scale of the position of the pointer 42. The indexing plate 41 is disposed adjacent, but not contiguous to the pointer 42 so that the scale of the indexing plate 41 mechanically provides a direct and visual reading of the pressure in the pneumatic tire 12.

From the foregoing it can be seen that a mechanical electromagnetic pressure sensor for use in a remote tire pressure indicator has been described. The mechanical electromagnetic pressure sensor has a bellows which is fluidly coupled to the tire in order to provide a mechanical and visually direct reading of the pressure in the tire. The mechanical electromagnetic pressure sensor is electromagnetically coupled to a ferrite rod in order to provide an electrical signal which is related to the pressure in the tire. It should be noted that the sketches are not drawn to scale and that distances of and between the figures are not to be considered significant.

Accordingly it is intended that the foregoing disclosure and showing made in the drawing shall be considered only as an illustration of the principles of the present invention.

What is claimed is:

1. A remote system for indicating tire pressure including a mechanical electromagnetic pressure sensor which is disposed outside a pnuematic tire which is mounted on a wheel rim, said remote system comprising:
   a. a bellows which is fluidly coupled to said pneumatic tire through said wheel rim; and
   b. a ferrite rod which is fixedly coupled to said bellows;
   c. a passive circuit including a first coil which is mechanically coupled to said wheel rim and a second coil which is electromagnetically coupled to said ferrite rod, which is slidably coupled to said second coil, all of which are electrically coupled in series to form a tuned circuit which resonates at a particular frequency which is dependent on the position of said ferrite rod;
   d. an oscillating circuit having a third coil of several turns on a rod of highly permeable material which is disposed adjacent to said first coil of said passive circuit on said wheel rim whereby said passive circuit receives energy from said oscillating circuit whereby the movement of said ferrite rod causes a change in the frequency at which said passive circuit resonates thereby producing a voltage across said third coil of said oscillating circuit which is proportional to the change of pressure in said pneumatic tire;
   e. amplifying means for amplifying said voltage which is electrically coupled to said oscillating circuit; and
   f. displaying means for displaying said amplified voltage in order to detect the change in frequency at which said passive circuit resonates thereby providing a measure of movement of said ferrite rod in response to the change in pressure of said pnuematic tire.

2. In a remote system for indicating tire pressure a mechanical electromagnetic pressure sensor according to claim 1 wherein said mechanical electromagnetic pressure sensor also comprises:
   a. a pointer which is mechanically coupled to said bellows;
   b. indexing means for providing a scale of the position of said pointer, said indexing means disposed adjacent, but not contiguous to said pointer so that said scale of said indexing means mechanically provides a direct and visual reading of the pressure in said pnuematic tire.

* * * * *